United States Patent
Gang et al.

(10) Patent No.: US 12,441,667 B2
(45) Date of Patent: Oct. 14, 2025

(54) METHOD FOR CULTIVATING FUNCTIONAL CROPS USING NANO ORGANIC GERMANIUM AND NANO ORGANIC SELENIUM

(71) Applicants: Yoon Young Gang, Gyeongsangnam-do (KR); Hwa Un Gang, Gyeongsangnam-do (KR); Goo Wan Jung, Gyeonggi-do (KR)

(72) Inventors: Yoon Young Gang, Gyeongsangnam-do (KR); Hwa Un Gang, Gyeongsangnam-do (KR); Goo Wan Jung, Gyeonggi-do (KR)

(*) Notice: Subject to any disclaimer, the term of this patent is extended or adjusted under 35 U.S.C. 154(b) by 704 days.

(21) Appl. No.: 17/794,812

(22) PCT Filed: Jan. 28, 2021

(86) PCT No.: PCT/KR2021/001124
§ 371 (c)(1),
(2) Date: Jul. 22, 2022

(87) PCT Pub. No.: WO2021/154001
PCT Pub. Date: Aug. 5, 2021

(65) Prior Publication Data
US 2023/0078468 A1  Mar. 16, 2023

(30) Foreign Application Priority Data
Jan. 28, 2020 (KR) .................. 10-2020-0010064
Jan. 27, 2021 (KR) .................. 10-2021-0011922

(51) Int. Cl.
*C05D 9/02* (2006.01)
*A01G 22/15* (2018.01)
(Continued)

(52) U.S. Cl.
CPC ............ *C05D 9/02* (2013.01); *A01G 22/15* (2018.02); *A01G 22/22* (2018.02); *A01G 22/25* (2018.02); *C05G 5/27* (2020.02)

(58) Field of Classification Search
CPC . C05D 9/02; C05G 5/27; A01G 22/15; A01G 22/22; A01G 22/25
See application file for complete search history.

(56) References Cited

FOREIGN PATENT DOCUMENTS

| CN | 106431603 A | * | 2/2017 | ............... C05B 1/02 |
| CN | 106966827 A | * | 7/2017 | ............... C05B 1/02 |

(Continued)

*Primary Examiner* — Wayne A Langel
(74) *Attorney, Agent, or Firm* — Revolution IP, PLLC

(57) ABSTRACT

A method for cultivating functional crops using nano organic germanium and nano organic selenium, includes performing irrigation or foliar fertilization on plants of the crops with nanoscaled organic germanium and nanoscaled organic selenium, which are prepared in nanoscale sizes by performing one or two or more selected from a method of applying physical energy (heat or pressure) to organic germanium and organic selenium, a method of applying electrical explosive energy, and a chemical bonding process, at least twice at the time when the plants of the crops are most vigorously grown and developed and at the time of maturation to bear fruit, wherein the prepared nanoscaled organic germanium and nanoscaled organic selenium are one-component materials which are dispersed in water as a solvent in a nanoscale state.

6 Claims, 2 Drawing Sheets

(51) Int. Cl.
*A01G 22/22* (2018.01)
*A01G 22/25* (2018.01)
*C05G 5/27* (2020.01)

(56) References Cited

FOREIGN PATENT DOCUMENTS

| CN | 108314486 | A | * | 7/2018 | ................ | C05C 3/00 |
| CN | 108739180 | A | * | 11/2018 | ................ | A01C 1/00 |
| CN | 108812122 | A | * | 11/2018 | ................ | C05D 9/02 |
| CN | 109041729 | A | * | 12/2018 | ............ | A01C 21/005 |
| CN | 110024644 | A | * | 7/2019 | ................ | C05D 9/02 |
| KR | 100718720 | B1 | * | 5/2007 | ................ | C05D 9/02 |
| KR | 101147535 | B1 | * | 5/2012 | ............ | A01C 11/006 |
| KR | 20140006461 | A | * | 1/2014 | ............. | A01G 22/15 |
| KR | 1020150015282 | | | 2/2015 | | |
| KR | 20200001639 | A | * | 1/2020 | ............. | A01G 22/25 |

* cited by examiner

TEM Image of Organic Ge
Average Particle Size 20nm

TEM Image of Organic Se
Average Particle Size 15nm

METHOD FOR CULTIVATING FUNCTIONAL CROPS USING NANO ORGANIC GERMANIUM AND NANO ORGANIC SELENIUM

BACKGROUND

The present invention relates to a method for cultivating functional crops using nano organic germanium and nano organic selenium, and more particularly, to a method for cultivating functional crops using nano organic germanium and nano organic selenium, which includes, in cultivating crops such as rice, potatoes, corn, Chinese cabbage, etc., performing irrigation or foliar fertilization on plants of the crops with organic germanium/organic selenium which are prepared as a one-component material by nanoprocessing techniques, thus to allow each component of the material to be incorporated into the crops such as rice, potato, corn, and Chinese cabbage, etc., such that storage stability according to the characteristics of each corresponding crop is increased or sugar content is improved, as well as the yield of the crops is increased.

Many clinical trials and papers for preventing and treating diseases such as cancer/diabetes/blood pressure using organic germanium have already been reported. In this case, many cases of applying the organic germanium to crops have also been reported.

It is also known that selenium produces an enzyme called glutathione peroxidase in the human body, and has an antioxidant function to prevent aging by protecting cells from active oxygen, i.e., superoxide protective properties 2,000 times higher than that of vitamin C. In addition, many cases of applying the selenium to crops have been reported. However, no case of applying nanoscaled organic germanium/organic selenium to the crops has been confirmed yet. In particular, when performing irrigation or foliar fertilization on plants of the crops with the nanoscaled organic germanium and organic selenium in a one-component material state using water as a solvent, organic germanium and organic selenium components are simultaneously detected in each corresponding crop. Further, there is a need for a method of cultivating crops which has effects of increasing storage stability, improving sugar content and increasing yield of the crops, while preventing and treating diseases caused by bacteria/fungi during the growth of the crops, even when using nano organic germanium and organic selenium in a minimum amount (50 ppm or less). However, no case of such the crop cultivation method has been confirmed yet.

Prior Art Document: Korean Patent Registration No. 10-1517074 Publication No. 10-1517074 (registered on Apr. 27, 2015) (Title of invention: Cultivation of organic germanium and organic selenium-containing bean sprouts and a method for producing dried bean sprouts with excellent storage and convenience)

SUMMARY OF INVENTION

In consideration of the above-mentioned circumstances, it is an object of the present invention to provide a method for cultivating functional crops, which includes, in cultivating crops such as rice, potatoes, corn, Chinese cabbage, etc., performing irrigation or foliar fertilization on plants of the crops with organic germanium/organic selenium which are prepared as a one-component material by nanoprocessing techniques, thus to allow each component of the material to be incorporated into the crops such as rice, potato, corn, and Chinese cabbage, etc., such that storage stability according to the characteristics of each corresponding crop is increased or sugar content is improved, as well as the yield of the crops is increased.

To achieve the above object, according to an aspect of the present invention, there is provided a method for cultivating functional crops using nano organic germanium and nano organic selenium, the method including:

performing irrigation or foliar fertilization on plants of the crops with nanoscaled organic germanium and nanoscaled organic selenium, which are prepared in nanoscale sizes by performing one or two or more selected from a method of applying physical energy (heat or pressure) to organic germanium and organic selenium, a method of applying electrical explosive energy, and a chemical bonding process, at least twice at the time when the plants of the crops are most vigorously grown and developed and at the time of maturation to bear fruit, wherein the prepared nanoscaled organic germanium and nanoscaled organic selenium are one-component materials which are dispersed in water as a solvent in a nanoscale state.

As described above, in accordance with the method for cultivating functional crops using nano organic germanium and nano organic selenium according to the present invention, there are advantages as follows. In the present invention, the reason for performing irrigation or foliar fertilization on plants of crops with nano organic germanium and organic selenium prepared in nanoscale sizes as a one-component material in growing and fruiting processes of the crops is that, when separately using each above material, it is possible to reduce cumulative labor cost burden, but when performing irrigation or foliar fertilization on the plants with only organic germanium, since the germanium has a characteristic of making the cells of living things stronger, it can also help the proliferation of bacteria/fungal cells. In this case, when using organic selenium together with germanium, it is possible to suppress the proliferation of microorganisms, and impart the functions of organic germanium and organic selenium to crops.

DETAILED DESCRIPTION OF THE INVENTION

Figure 1:
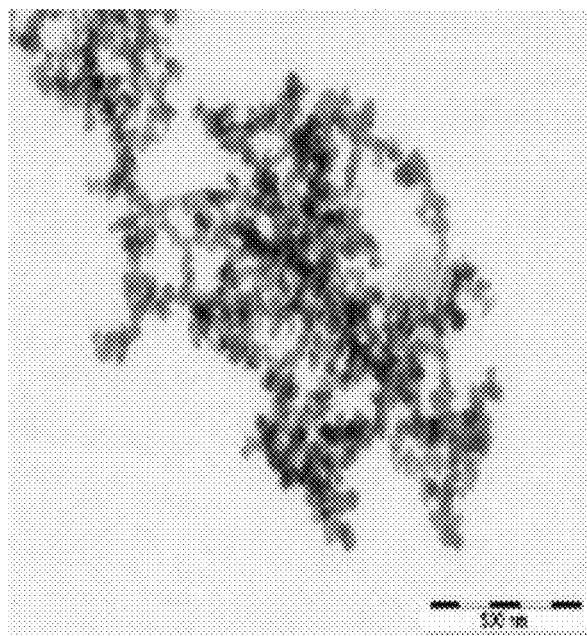
FIG. 1 is a diagram illustrating an electron microscope (TEM) image of organic germanium used in the present invention.

To achieve the above object, according to an aspect of the present invention, there is provided a method for cultivating functional crops using nano organic germanium and nano organic selenium, the method including:

performing irrigation or foliar fertilization on plants of the crops with nanoscaled organic germanium and nanoscaled organic selenium, which are prepared in nanoscale sizes by performing one or two or more selected from a method of applying physical energy (heat or pressure) to organic germanium and organic selenium, a method of applying electrical explosive energy, and a chemical bonding process, at least twice at the time when the plants of the crops are most vigorously grown and developed and at the time of maturation to bear fruit, wherein the prepared nanoscaled organic germanium and nanoscaled organic selenium are one-component materials which are dispersed in water as a solvent in a nanoscale state.

In addition, the organic germanium (Ge) may have a particle size of 1-100 nm, and a final concentration in use for irrigation or foliar fertilization may be 0.00001-0.005 wt. % (0.1-50 ppm) based on a weight of water, and the organic selenium (Se) may have a particle size of 1-70 nm, and a final concentration in use for irrigation or foliar fertilization may be 0.00001-0.004 wt. % (0.1-40 ppm) based on the weight of water.

Further, the organic germanium may have a purity of 99% or more, and the organic germanium may use nano organic germanium which is prepared in a nanoscale size by using, in particular bis(2-carboxyethylgermanium sesquioxide $(O[Ge(=O)CH_2CH_2CO_2H]_2)$, organic germanium using yeast strains, or a germanium compound as a basic raw material, and performing one or two or more selected from a method of applying physical energy (heat or pressure), a method of applying electrical explosive energy, and a chemical bonding process.

Further, the germanium compound may be obtained by dissociating one or two or more selected from the raw material group of [Germanium chloride; $GeCl_4$, Germanium chloride dioxane complex; $C_4H_8C_{12}GeO_2$, Germanium fluoride; $GeF_4$, Germanium iodide; $GeI_2$, $GeI_4$, Germanium isopropoxide; $Ge(OCH(CH_3)_2)_3$, Germanium methoxide; $Ge(OCH_3)_4$, Germanium nitride; $Ge_3N_4$, Germanium oxide; $GeO_2$, Germanium selenide; GeSe, $GeSe_2$, and Germanium sulfide; GeS], and reducing ions to extract germanium (Ge).

Further, the organic selenium may be composed of a selenium compound, and the selenium compound may be obtained by dissociating one or two or more selected from the raw material group of (Selenium oxychloride; $SeOCl_2$, Selenium sulfide; $SeS_2$, Selenium tetrachloride; $SeCl_4$, Selono-L-cystine; $C_6H_{12}N_2O_4Se_2$, Seleno-L-methionine; $CH_3SeCH_2CH_2CH(NH_2)CO_2H$, Selenophene; $C_4H_4Se$, Selenious acid; $H_2SeO_3$, and Germanium selenide; GeSe, $GeSe_2$), and reducing ions to extract selenium.

Further, an additive (or reducing agent) used in the process of preparing the organic germanium and organic selenium may include one or two or more materials selected from formaldehyde, tocopherol, organic acids (formic acid, citric acid, acetic acid, maleic acid or an organic acid having 4 or less carbon atoms), and methylethanolamine $[HOCH_2CH_2N(CH_3)_2]$.

Furthermore, in the process of preparing the organic germanium and organic selenium in nanoscales by organization, one or two or more materials selected from the group consisting of polyvinylpyrrolidone polyoxyethylene stearate, polyvinyl butylal, polyvinyl alcohol, glutathione, L-arginine, L-threonine, and L-alanine, which have an average molecular weight of 40,000, may be mixed and used as a dispersion stabilizer, such that even when the nanoscaled organic germanium and organic selenium are respectively prepared, and then mixed with water as a solvent in a predetermined ratio, the prepared organic germanium and organic selenium may be dispersed in water as one-component while maintaining stability.

Hereinafter, a method for cultivating functional crops using nano organic germanium/nano organic selenium according to the present invention will be described in detail with reference to the accompanying drawings.

The material used in the present invention is a material including organic germanium and organic selenium which are prepared by nanoprocessing techniques. The present invention defines a technique designed to prevent/treat diseases as well as to grow functional crops by performing irrigation or foliar fertilization on plants of the crops in a state in which respective materials are mixed depending on the growth and fruition characteristics of the crops and the danger period of disease.

Irrigation fertilization (i.e., injected fertilization) refers to a fertilization method of dissolving fertilizer in water and injecting it into the soil through irrigation under pressure (source, [Naver Knowledge Encyclopedia] [Injected fertilization] (Soil Fertilizer Term Dictionary, 2012. 12, Korea Soil Fertilizer Society).

Then foliar fertilization (i.e., foliar application) will be described. Crops can absorb nutrients not only through the roots, but also through the leaf surfaces (i.e., phylloplane). Therefore, if necessary, fertilizer is applied to the leaves in a solution state, which refers to foliar fertilization or foliar application of fertilizer.

The foliar fertilization has an advantage of easier and faster absorption of fertilizer components than soil fertilization, and foliar fertilization may also be performed when soil fertilization is difficult. Therefore, the foliar fertilization is used only in the following cases including: a case of supplying trace elements (e.g., supply of Mn and Fe to rice in aged paddy soil, Mg to apples, Zn to citrus fruits); a case in which absorption capacity of the roots is weakened (e.g., rice in aged paddy soil, barley that has been damaged by moisture); a case of rapid nutrient recovery (e.g., from frost damage, flood damage, or damage by harmful insects); a case of improving quality of the final product (e.g., flowers before budding; grasses before harvest); a case of preventing loss of fertilizer (e.g., from flowers in pots); a case of saving labor (e.g., due to mixed application of pesticides and fertilizers); when soil fertilization is difficult (e.g., when growing fresh plants in an orchard); and the like.

The foliar fertilization cannot replace all soil fertilization because a large amount of fertilizer cannot be used at once. It is safest to supply nitrogen as urea, and there are few side effects such as burning leaves. Nitrogen is applied in 0.5-1.0% aqueous solution. Potassium is applied in 0.5-1.0% solution of potassium sulfate ($K_2SO_4$), magnesium is applied in 0.5-1.0% solution of magnesium sulfate ($MgSO_4$), manganese is applied in 0.2-0.5% solution of manganese sulfate ($MnSO_4$), iron is applied in 0.2-1.0% of iron sulfate ($FeSO_4$) solution, zinc is applied in 0.2-0.5% solution of zinc sulfate ($ZnSO_4$), copper is applied in 1% solution of copper sulfate ($CuSO_4$), boron is applied in 0.1-0.3% solution of borax, and molybdenum is applied in 0.0005-0.01% solution of molybdate. Foliar application agents made for foliar applying by admixing various fertilizer elements or removing subcomponents have also been developed (source: [Naver Knowledge Encyclopedia] [Foliar fertilization, foliar application] (Soil Term Dictionary, 2000. 10. 15, Ryu Soon-ho).

Meanwhile, the material used in the present invention is nanoscaled organic germanium and organic selenium, and many cases, in which non-nanoscaled materials or inorganic materials which are not organic materials are applied to crop cultivation, have been reported. However, no case of applying organic germanium and organic selenium as nanomaterials to crop cultivation has been confirmed yet. In particular, there is no example of using germanium and selenium as an organic material and water as a solvent in a one-component material (organic germanium and organic selenium are simultaneously introduced).

The one-component material will be described in more detail. It is not a big problem to use common materials by mixing two or more materials (components) together in one type of solvent (e.g., water, or ethanol, etc.). However, in the area of nanoprocessing techniques, it is not easy to maintain two or more types of materials (e.g., platinum/gold, silver/copper, germanium/selenium, etc.) in one type of solvent without reacting with each other in a stabilized state. Therefore, in the present invention, the technique of preparing, storing, diluting, and applying nano organic germanium and nano organic selenium in a one-component material has a value of the one-component as a material itself, and when applying the material of the present invention on the plants of crops, the nano organic germanium and nano organic selenium are treated at once without sequentially performing the irrigation and foliar fertilization, such that it also has the meaning of saving labor. Nano organic germanium has no antibacterial activity and has a function to help the proliferation of microorganisms. Therefore, especially in a liquid state, an antibacterial agent and a preservative are necessarily required. However, the present invention has an advantage of using the antibacterial/antiseptic power of nano organic selenium without using a separate antimicrobial/preservative.

The nano organic selenium of the present invention has minimum inhibitory concentrations (MICs) for development of antimicrobial resistant bacteria, which are effective from 1 ppm, whereas antiseptic power is effective from a range of 5-10 ppm.

Technical details of the present invention are that, in cultivating crops such as rice, potatoes, corn, Chinese cabbage, etc., by performing irrigation and foliar fertilization on plants of the crops with nanoscaled organic germanium/organic selenium which are prepared by nanoprocessing techniques in the growing and fruiting processes of the crops, each organic germanium/organic selenium material may be incorporated into the resulting products of the crops such as rice, potato, corn, and Chinese cabbage, etc., and thereby allowing each used material to exhibit unique functionality thereof, thus to obtain functional crops.

The present inventors performed experiments several times on different types of crops in various parts of Korea for about 15 years, and repeatedly performed experiments through trial and error. Based on these results, the technical content of the present invention was derived, and the present invention has been completed and filed based on this comprehensive conclusion.

Organic germanium used in the present invention has a purity of 99% or more, and the organic germanium is nano organic germanium prepared in a nanoscale size by using, in particular bis(2-carboxyethylgermanium sesquioxide); $(O[Ge(=O)CH_2CH_2CO_2H]_2)$, organic germanium using yeast strains, or a germanium compound as basic raw materials, respectively, and performing one or two or more of a process of applying physical energy, a process of applying electrical explosive energy, and a chemical bonding process. The above processes are intended to reduce only the size of the organically-agglomerated material, and to reduce the size of the material to a nanoscale by splitting the molecular weight. Herein, the yeast strain serves to eat and excrete inorganic germanium to make it organic material, while splitting molecular masses to be dispersed and stabilized.

The organic germanium (Ge) has a particle size of 1-100 nm, and the final concentration in use is 0.00001-0.005 wt. % (0.1-50 ppm) based on a weight of water for irrigation or foliar fertilization. The germanium compound includes a compound obtained by dissociating one or two or more materials selected from the raw material group of [Germanium chloride; $GeCl_4$, Germanium chloride dioxane complex; $C_4H_8Cl_2GeO_2$, Germanium fluoride $GeF_4$, Germanium iodide; $GeI_2$, $GeI_4$, Germanium isopropoxide; $Ge(OCH(CH_3)_2)_3$, Germanium methoxide; $Ge(OCH_3)_4$, Germanium nitride; $Ge_3N_4$, Germanium oxide; $GeO_2$, Germanium selenide; GeSe, GeSez, and Germanium sulfide; GeS], and reducing ions to extract germanium (Ge).

The organic selenium (Se) has a particle size of 1-70 nm, and the final concentration in use is 0.00001-0.004 wt. % (0.1-40 ppm) based on the weight of water for irrigation or foliar fertilization. The selenium compounds includes a compound obtained by dissociating one or two or more materials selected from the raw material group of (Selenium oxychloride; $SeOCl_2$, Selenium sulfide; $SeS_2$, Selenium tetrachloride; $SeCl_4$, Seleno-L-cystine; $C_6H_{12}N_2O_4Se_2$, Seleno-L-methionine; $CH_3SeCH_2CH_2CH(NH_2)CO_2H$, Selenophene; $C_4H_4Se$, Selenious acid; $H_2SeO_3$, and Germanium selenide; GeSe, $GeSe_2$), and reducing ions to extract selenium.

The process of preparing the nanoscaled organic material includes performing one or two or more selected from a method of applying physical energy (heat or pressure), a method of applying electrical explosive energy, and a chemical bonding process.

Additives (or reducing agents) used during the process of preparing nanoscaled organic materials include one or two or more selected from formaldehyde, tocopherol, organic acids (formic acid, citric acid, citric acid, acetic acid, maleic acid, and an organic acid having 4 or less carbon atoms), and methylethanolamine $[HOCH_2CH_2N(CH_3)_2]$, (otherwise, they include all of formaldehyde, tocophenol, and organic acids, or optionally include one or two or more thereof).

In addition, the organic germanium and organic selenium are prepared as a one-component material dispersed in water as a solvent in a nanoscale state. Commonly, in a state in which two or more nanomaterials are not oxidized or precipitated without energetic interaction with each other in one solvent, it is not easy to provide compatibility and stability to the desired product. In the present invention, a dispersion stabilizer in the process of preparing germanium and selenium in nanoscale sizes may include one or two or more selected from the group consisting of polyvinylpyrrolidone polyoxyethylene stearate, polyvinyl butylal, polyvinyl alcohol, glutathione, L-arginine, L-threonine, and L-alanine, which have an average molecular weight of 40,000, which are commonly mixed and used. Therefore, the dispersion stabilizer includes a material in which organic germanium and organic selenium are dispersed in water as a one-component material, even when mixing with water as a solvent in a predetermined ratio after having been prepared separately while maintaining stability.

In order to minimize the number of times of irrigation or foliar fertilization, inhibit the proliferation of microorganisms, and increase the effect of the desired functional crop, the material used in the present invention should be materials having a nanoparticle size (1-100 nm), respectively. In addition, these materials are prepared as a one-component material dispersed in water as a solvent. In addition, in order to minimize the toxicity of the inorganic material and facilitate absorption into crops, the materials used in the present invention should be organic materials. Further, the concentration of each material used at once will be 50 ppm as the maximum value. Herein, even if a concentration of 50 ppm or more is used, there is no effect on the crops, but as a result of comparing and examining the level of crop growth, increasing sugar content, minimizing damage by harmful insects and improving immunity, as well as economic feasibility thereof, it was confirmed that the concentration of nano organic germanium was about 50 ppm and the concentration of nano organic selenium was about 40 ppm as the maximum efficiency value. Although this is a sufficient concentration, the upper limit during use may be increased if necessary.

In general, organic germanium in a natural state exists in a state of being eaten and excreted by microorganisms, and it is a very small concentration (0.000000345 wt. %: 3.45 μg/kg).

Therefore, inorganic germanium can be absorbed by plants only after being eaten and excreted by microorganisms, and its effect and concentration are very small, such that it cannot be detected in the plants. In other words, it is difficult to apply to the plants in practice.

In addition, since Korean soil is selenium-deficient, it is difficult to sufficiently detect organic selenium in crops grown in these soils.

In order to solve the above-described problems, it is preferable to perform irrigation or foliar fertilization on the plants of crops with nano organic germanium and nano organic selenium prepared by nanoprocessing techniques. Concentration and time in use of these materials differ depending on types of the crops, but it is preferable to perform irrigation and foliar fertilization focusing on the time of the most vigorous growth and development of the plants and the time of maturation of the crops to bear fruit. In the case of leafy vegetables, foliar fertilization is frequently performed by decreasing the concentration used to cultivate functional crops. For example, in the case of rice, it is possible to perform irrigation or foliar fertilization once after the rice flowers fall and once at the time of harvesting rice, respectively.

Figure 2:
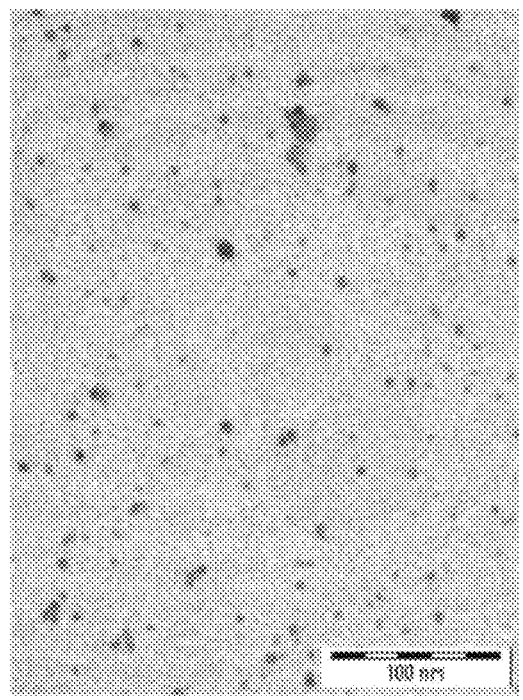
FIG. 2 is a diagram illustrating an electron microscope (TEM) image of organic selenium used in the present invention.

It is confirmed that organic germanium and organic selenium having a size of nanoparticles used in the present invention are nanomaterials by observing an electron microscope (TEM) image of (FIG. 1) and examining FT-NMR analysis data of (FIG. 2). As shown in Table 1 below, in order to minimize the amount of these materials used and maximize their efficiency, organic germanium having a purity of 99%, a particle size of 1-100 nm, and a raw material concentration of 100 ppm to 5,000 ppm is used, and the final concentration in use once to the crops is set to be 0.1-50 ppm. Organic selenium having a purity of 98% or more, a particle size of 1-70 nm, and a raw material concentration of 100 ppm to 50000 ppm is used, and the final concentration in use once is set to be 0.1-40 ppm (see Table 1 below). However, each concentration and final concentration in use are not limited thereto, and of course, may be variously changed within the range for achieving the purpose of the present invention.

TABLE 1

| | Purity | Particle size | Raw material concentration | Final concentration in use once | Remark |
|---|---|---|---|---|---|
| Organic germanium | ≥99% | 1-100 nm | 100-5,000 ppm | 0.1-50 ppm | |
| Organic selenium | ≥98% | 1-70 nm | 100-5,000 ppm | 0.1-40 ppm | |

In addition, the organic germanium and organic selenium are prepared as a one-component material dispersed in water as a solvent in a nanoscale state. Commonly, in a state in which two or more nanomaterials are not oxidized or precipitated without energetic interaction with each other in one solvent, it is not easy to provide compatibility and stability to the desired product. In the present invention, a dispersion stabilizer in the process of preparing germanium and selenium in nanoscale sizes may include one or two or more selected from the group consisting of polyvinylpyrrolidone polyoxyethylene stearate, polyvinyl butylal, polyvinyl alcohol, glutathione, L-arginine, L-threonine, and L-alanine, which have an average molecular weight of 40,000, which are commonly mixed and used. Therefore, the organic germanium and organic selenium are dispersed in water as a one-component material, even when mixing with water as a solvent in a predetermined ratio after having been prepared separately while maintaining stability.

According to the above-described present invention, it was verified that rice-cultivation demonstrated an effect of increasing the yield by up to 30% of an average value, and corns had an effect of improving the sugar content up to 19 Brix. Further, as a result of experimental cultivation of potatoes, Chinese cabbages, radishes and jujubes, results of enhancing the cell tissue strength and increasing storage stability by 50% more was deduced.

Table 2 below illustrates the results of increased yields in the rice-cultivation.

TABLE 2

| Year of harvest | Rice yield (kg) | Yield increase rate (%) | Remark |
|---|---|---|---|
| Normal year | 1,080 | Base value | Based on 2008 1,000 Pyeong, located in Myeongdo-ri, Uljin-eup, Uljin-gun, Gyeongbuk |
| Year 1 | 1,440 | 33% | |
| Year 2 | 1,640 | 51% | |

The cultivation species is Chuchong rice (Japanese name: Akibare), and is a species which falls down too easily and has low yield.

Table 3 below illustrates the results of detection of germanium and selenium in crops, and summarizes result values based on the test report issued by the research institute of qualified offices.

TABLE 3

| Types of crops | | Rice | Potato | Chinese cabbage | Radish | (Big) jujube | Shiitake mushroom |
|---|---|---|---|---|---|---|---|
| Number of times of irrigation or foliar fertilization | | Twice | 3 times | 3 times | 3 times | Twice | Twice |
| Concentration in use (ppm) | Germanium | 10 | 10 | 10 | 10 | 5 | 10 |
| | Selenium | 5 | 5 | 5 | 5 | 5 | 5 |
| Cultivated area (m$^2$) | | 49,500 | 250 | 500 | 500 | 2,300 | 900 |
| Detected amount (ppb) | Germanium | 131 | 58 | 100 | 50 | 58 | 50 |
| | Selenium | 262 | 60 | 70 | 60 | 16 | 190 |
| Test report issuing office | | Korea Standard Testing and Analysis Institute | Jeonbuk Biological Resources Promotion Agency | | | Korea Standard Testing and Analysis Institute | |
| Cultivation year | | 2019 | 2006-2016 | | | 2019 | 2019 |
| Cultivation region | | Cheorwon, Gangwon-do | Miryang, Gyeongnam | | | Hongcheon, Gangwon-do | Muan, Jeollanam-do |

Before minerals are ionized, plants cannot absorb the same. Since germanium has a concentration of 3.45 ppb (3.45 μg/kg) in the natural state organically prepared by microorganisms, it is a too low concentration for plants to absorb it and to impart functions to the crop or to detect it in the result product of the crop. According to the data listed in Table 3 above, a concentration of 131 ppb is detected in rice, but to perform irrigation or foliar fertilization, a concentration of 70 times or more is required.

For an increase in the sugar content, as a result of testing uncooked (raw) corn (species: Super sweet corn) among corn types, the sugar content was an average level of 16 Brix, but as a result of performing irrigation or foliar fertilization thereon with organic germanium and organic selenium of the present invention, 21 Brix was detected, and thereby resulting in an increase in the sugar content of about 30%.

In general, big jujubes and oriental melons are crops with extremely short storage and distribution periods, but according to the present invention, in the case of the big jujubes, the period of containing water was increased to about 5 days, such that the marketability was maintained even when the period is increased. In the case of the oriental melons, it was confirmed that the storage and distribution period were longer by about 7 days than the conventional ones.

As described above, when irrigation or foliar fertilization is performed on the plants of crops with the nanoscaled organic germanium and organic selenium in a one-component material state, it could be confirmed that the crops had effects of increasing the yield and sugar content, or improving the storage to increase the distribution period, and germanium and selenium components were detected in each crop.

FIG. 1 is a diagram illustrating an electron microscope (TEM) image of organic germanium used in the present invention. The organic germanium has an average particle size of 20 nm. Since organic germanium is an organic material, it is not observed in a homogeneous state due to low dispersion stability, but has a feature capable of confirming that it is a nanomaterial.

FIG. 2 is a diagram illustrating an electron microscope (TEM) image of organic selenium used in the present invention. Since organic selenium is an organic material, the outline image is not clear, but it is confirmed to have an average size of about 15 nm.

Figure 3:
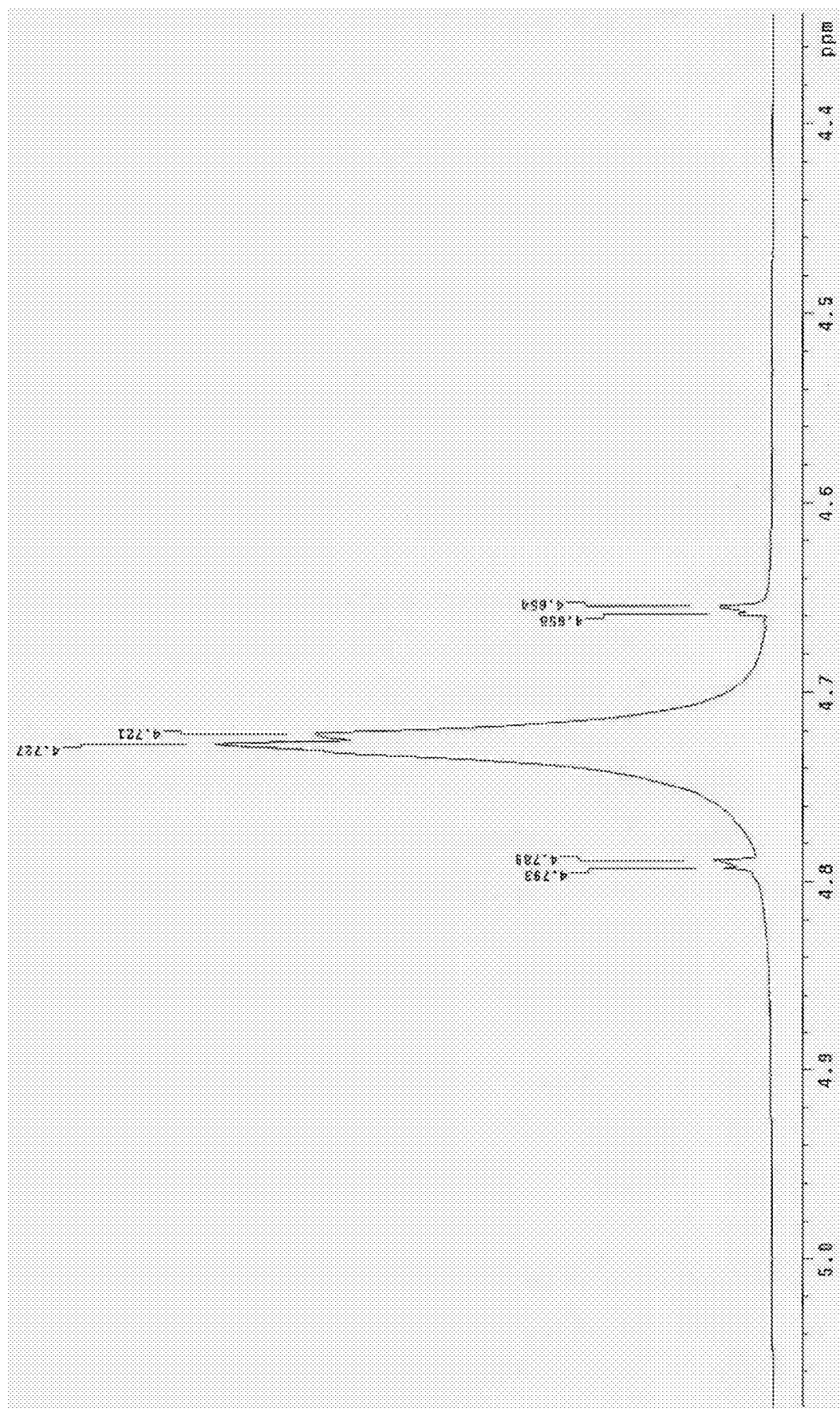
FIG. 3 is a graph illustrating Fourier transformation nuclear magnetic resonance (FT-NMR) analysis data of the organic selenium used in the present invention.

FIG. 3 is a graph illustrating Fourier transformation nuclear magnetic resonance (FT-NMR) analysis data of the organic selenium. Herein, the middle peak in a signal of 4-5 ppm indicates OH as a solvent in a water-soluble state, and the left/right peaks indicate hydrogen (H). This hydrogen is very likely to be bonded to carbon (C), and it is a characteristic that is the basis for assuming that this carbon (C) is an organic material.

As described above, in accordance with the method for cultivating functional crops using nano organic germanium and nano organic selenium according to the present invention, there are advantages as follows. In the present invention, the reason for performing irrigation or foliar fertilization on plants of crops with nano organic germanium and organic selenium prepared in nanoscale sizes as a one-component material in growing and fruiting processes of the crops is that, when separately using each above material, it is possible to reduce cumulative labor cost burden, but when performing irrigation or foliar fertilization on the plants with only organic germanium, since the germanium has a characteristic of making the cells of living things stronger, it can also help the proliferation of bacteria/fungal cells. In this case, when using organic selenium together with germanium, it is possible to suppress the proliferation of microorganisms, and impart the functions of organic germanium and organic selenium to crops.

The invention claimed is:

1. A method for cultivating functional crops using nano organic germanium and nano organic selenium, the method comprising:

performing irrigation or foliar fertilization on plants of the crops with nanoscaled organic germanium and nanoscaled organic selenium, which are prepared in nanoscale sizes by performing one or two or more selected from a method of applying physical energy selected from the group consisting of heat and pressure to organic germanium and organic selenium, a method of applying electrical explosive energy, and a chemical bonding process, at least twice at the time when the plants of the crops are most vigorously grown and developed and at the time of maturation to bear fruit, wherein the prepared nanoscaled organic germanium and nanoscaled organic selenium are onecomponent materials which are dispersed in water as a solvent in a nanoscale state, wherein the organic selenium is composed of a selenium compound, and the selenium compound is obtained by dissociating one or two or more raw materials selected from the group of consisting of selenium oxychloride (SeOCl$_2$), selenium sulfide (SeS$_2$), selenium tetrachloride (SeCl$_4$), selono-L-cystine (C$_6$H$_{12}$N$_2$O$_4$Se$_2$), seleno-L-methionine (CH$_3$SeCH$_2$CH$_2$CH(NH$_2$)CO$_2$H), selenophene (C$_4$H$_4$Se), selenous acid ($H_2SeO_3$), and germanium selenide (GeSe, $GeSe_2$), and reducing ions to extract selenium.

2. The method according to claim 1, wherein the organic germanium has a purity of 99% or more, and the organic germanium uses nano organic germanium which is prepared in a nanoscale size by using, as a basic raw material, one or more materials selected from the group consisting of bis (2-carboxyethylgermanium sesquioxide (O[Ge($=$O) $CH_2CH_2CO_2H]_2$), organic germanium using yeast strains, and a germanium compound as a basic raw material, and performing one or two or more selected from a process of applying the physical energy, a process of applying electrical explosive energy, and a chemical bonding process.

3. The method according to claim 2, wherein the germanium compound is obtained by dissociating one or two or more selected from the raw material group of germanium chloride ($GeCl_4$), germanium chloride dioxane complex ($C_4HsC_{12}GeO_2$), germanium fluoride ($GeF_4$), germanium iodide ($GeI_2$, $GeI_4$), germanium isopropoxide ($Ge(OCH(CH_3)_2)_3$), germanium methoxide ($Ge(OCH_3)_4$), germanium nitride ($Ge_3N_4$), germanium oxide ($GeO_2$), germanium selenide (GeSe, $GeSe_2$), and germanium sulfide (GeS), and reducing ions to extract germanium (Ge).

4. The method according to claim 1, wherein the organic germanium (Ge) has a particle size of 1-100 nm, and a final concentration in use for irrigation or foliar fertilization is 0.00001-0.005 wt. % (0.1-50 ppm) based on a weight of water, and the organic selenium (Se) has a particle size of 1-70 nm, and a final concentration in use for irrigation or foliar fertilization is 0.00001-0.004 wt. % (0.1-40 ppm) based on the weight of water.

5. The method according to claim 1, wherein an additive used in the process of preparing the organic germanium and organic selenium includes one or two or more materials selected from the group consisting of formaldehyde, tocopherol, organic acids selected from the group consisting of formic acid, citric acid, acetic acid, maleic acid, and an organic acid having 4 or less carbon atoms, and methylethanolamine ($HOCH_2CH_2N(CH_3)_2$).

6. The method according to claim 1, wherein in the process of preparing the organic germanium and organic selenium in nanoscales by organization, one or two or more materials selected from the group consisting of polyvinylpyrrolidone polyoxyethylene stearate, polyvinyl butylal, polyvinyl alcohol, glutathione, L-arginine, L-threonine, and Lalanine, which have an average molecular weight of 40,000, are mixed and used as a dispersion stabilizer, such that even when the nanoscaled organic germanium and organic selenium are respectively prepared, and then mixed with water as a solvent in a predetermined ratio, the prepared organic germanium and organic selenium are dispersed in water as one-component while maintaining stability.

* * * * *